United States Patent
Traktirnik et al.

(10) Patent No.: US 12,164,625 B2
(45) Date of Patent: Dec. 10, 2024

(54) CONTEXT BASED AUTHORIZED EXTERNAL DEVICE COPY DETECTION

(71) Applicant: Proofpoint, Inc., Sunnyvale, CA (US)

(72) Inventors: Boris Traktirnik, Ashdod (IL); Liliya Anissimov, Rishon-Lezion (IL); Gabriel Kalmar, Raanana (IL); Nir Barak, Karmei Yosef (IL); Ariel Lemelson, Tel Aviv (IL)

(73) Assignee: Proofpoint, Inc., Sunnyvale, CA (US)

( * ) Notice: Subject to any disclaimer, the term of this patent is extended or adjusted under 35 U.S.C. 154(b) by 205 days.

(21) Appl. No.: 17/419,780

(22) PCT Filed: Jan. 3, 2020

(86) PCT No.: PCT/US2020/012125
§ 371 (c)(1),
(2) Date: Jun. 30, 2021

(87) PCT Pub. No.: WO2020/142651
PCT Pub. Date: Jul. 9, 2020

(65) Prior Publication Data
US 2022/0083646 A1    Mar. 17, 2022

Related U.S. Application Data

(60) Provisional application No. 62/788,217, filed on Jan. 4, 2019.

(51) Int. Cl.
*G06F 21/53* (2013.01)
*G06F 21/54* (2013.01)
(Continued)

(52) U.S. Cl.
CPC .............. *G06F 21/53* (2013.01); *G06F 21/54* (2013.01); *G06F 21/83* (2013.01); *G06F 21/84* (2013.01)

(58) Field of Classification Search
CPC ..... G06F 21/53–556; G06F 21/60–606; G06F 21/83–84
See application file for complete search history.

(56) References Cited

U.S. PATENT DOCUMENTS 8,499,152 B1 * 7/2013 Chen ...................... H04L 63/20
713/165
10,114,960 B1 * 10/2018 McClintock ........ H04L 63/1408
(Continued)

OTHER PUBLICATIONS

EventTracker: Removable Media Device Monitoring, 2011. (Year: 2011).*
(Continued)

*Primary Examiner* — Trong H Nguyen
(74) *Attorney, Agent, or Firm* — Sheehan Phinney Bass & Green PA

(57) ABSTRACT

A system and method monitors access of an external storage device connected to a target device. A notification of a connection of the external storage device to the target device is received, a notification of an external file access on the external storage device is received, and activity of a user on the target device is monitored to detect a user operation accessing a source file stored on the target device. Events are logged based upon the connection, the user operation, and the external file access. Two or more of the events are associated with a copy of the source file to the external connected storage device and the source file history. An alert regarding the association is forwarded to a monitor application in communication with the target device.

21 Claims, 12 Drawing Sheets

(51) Int. Cl.
*G06F 21/83* (2013.01)
*G06F 21/84* (2013.01)

(56) References Cited

U.S. PATENT DOCUMENTS

| | | | |
|---|---|---|---|
| 2006/0074855 A1* | 4/2006 | Miyamoto | G06F 21/6227 |
| 2006/0206628 A1* | 9/2006 | Erez | H04N 1/00204 |
| | | | 710/8 |
| 2007/0156659 A1 | 7/2007 | Lim | |
| 2007/0204055 A1 | 8/2007 | Oishi et al. | |
| 2008/0212111 A1* | 9/2008 | Masuda | G06F 16/93 |
| | | | 358/1.9 |
| 2009/0292930 A1* | 11/2009 | Marano | G06F 21/6218 |
| | | | 726/28 |
| 2010/0077214 A1 | 3/2010 | Jogand-Coulomb et al. | |
| 2010/0125911 A1* | 5/2010 | Bhaskaran | G06Q 10/10 |
| | | | 715/781 |
| 2011/0239306 A1* | 9/2011 | Avni | G06F 21/62 |
| | | | 726/26 |
| 2012/0233216 A1 | 9/2012 | Lim | |
| 2015/0237070 A1* | 8/2015 | Manmohan | G06F 21/606 |
| | | | 726/1 |
| 2015/0347452 A1* | 12/2015 | Cho | G06F 16/122 |
| | | | 707/784 |
| 2020/0050763 A1* | 2/2020 | Malm | G06F 21/52 |

OTHER PUBLICATIONS

Tu, Manghui; Spoa-Harty, Kimberly; and Xiao, Liangliang (2015) "Data Loss Prevention Management and Control: Inside Activity Incident Monitoring, Identification, and Tracking in Healthcare Enterprise Environments," Journal of Digital Forensics, Security and Law: vol. 10 : No. 1 , Article 3. (Year: 2015).*
International Search Report dated Apr. 2, 2020 for PCT/US20/12125.
EventTracker. "EventTracker: Removable Media Device Monitoring," EventTracker, Columbia MD 21045 www.eventracker.com, Dec. 21, 2011.
Extended European Search Report for EP20736008.2 dated Apr. 14, 2022.

* cited by examiner

Devices

| | |
|---|---|
| Storage Device | WD - My Passport 071D |
| Storage Size | 1000170586112 |
| Storage Volume Device | /dev/disk2s10 |
| Storage Volume Size | 1000035426304 |
| Storage Volume File-System Label | Apple_HFS_Untitled_1 |
| Storage Volume File-System Mount | /Volumes/My Passport Studio |
| Storage Volume File-System Size | 1000035426304 |
| USB Serial | 57584131454231 5A43433438 |
| USB Vendor Name | WD |
| USB Product Name | My Passport 071D |

| Time | File Path | Operation | Details | Login | Application |
|---|---|---|---|---|---|
| 12/14/2019 09:07 AM | /Users/nirbarak/Desktop/USB_Device_1.png | Copied to | ⬇/Volumes/NirBackup2/USB_Device_1.png | nirbarak | DesktopServicesH |

1–1 of 1    [20] Items per page    File Path [✓] Show Path

FIG.4B

▼More Filters    [Show] [Reset]

Copied to: Unlisted USB
S/N: 57584431414138 4C39344C34
Model: My Passport 25E1
Vendor: WD
Label: NirBackup2
Destination path: /Volumes/NirBackup2/USB_Device_1.png

| Time | File Path | Operation | Details | Login | Application |
|---|---|---|---|---|---|
| 12/14/2019 09:07 AM | /Users/nirbarak/Desktop/USB_Device_1.png | Copied to | ⬇/Volumes/NirBackup2/USB_Device_1.png | nirbarak | DesktopServicesH |

1–1 of 1    [20] Items per page    File Path [✓] Show Path

FIG. 4D

| Time | Application/Website | Activity Details |
|---|---|---|
| 9:05:24 AM | Microsoft Word | Light And Authorized USB Copy Detection 12Dec2019 |
| 9:05:50 AM | USB Storage Device | USBCONNECT Unlisted USB: [5758443141384C39344C34, My Passport 25E1, WD, Nir Backup] |
| 9:05:51 AM | Microsoft Word | Light And Authorized USB Copy Detection 12Dec2019 |
| 9:06:01 AM | Microsoft Word | Microsoft Word — no window |
| 9:06:05 AM | Finder | Window Title Is Unavailable |
| 9:06:08 AM | Microsoft Word | Light And Authorized USB Copy Detection 12Dec2019 |
| 9:06:28 AM | Microsoft Word | Microsoft Word — no window |
| 9:06:29 AM | Finder | Window Title Is Unavailable |
| 9:06:31 AM | | Finder—Window Title Is Unavailable |
| 9:06:32 AM | Microsoft Word | Light And Authorized USB Copy Detection 12Dec2019 |
| 9:07:00 AM | Finder | Window Title Is Unavailable |
| 9:07:00 AM | | NirBackup2 |
| 9:07:19 AM | | Copied file "USB_Device_1.png" To Unlisted USB: /Volumes/NirBackup2/ [5758443141384C39344C34, My Passport 25E1, WD, NirBackup2] |
| 9:07:26 AM | | FILECOPY (1,0.208MB) – USB_Device_1.png, path=/Users/nirbarak/Desktop |
| 9:07:28 AM | developer.apple.com | DARegisterDiskAppearedCallback–DiskArbitration|Apple Developer Documentation |
| 9:07:28 AM | | DARegisterDiskAppearedCallback–DiskArbitration|Apple Developer Documentation–Google Chrome |
| 9:07:30 AM | 10.3.0.57 | ObserveIT–Configuration–Alert&Prevent Rules–Google Chrome |
| 9:07:40 AM | | ObserveIT–Login Page–Google Chrome |

FIG. 4F

CONTEXT BASED AUTHORIZED EXTERNAL DEVICE COPY DETECTION

CROSS-REFERENCE TO RELATED APPLICATIONS

This application is a national stage entry of PCT Application PCT/US20/12125, filed Jan. 3, 2020 and entitled "Context Based Authorized External Device Copy Detection", which claims the benefit of U.S. Provisional Patent Application Ser. No. 62/788,217, filed Jan. 4, 2019, entitled "Light, non-intrusive, context based and authorized external device copy detection with cross user and endpoint investigation capabilities," both of which are incorporated by reference herein in their entirety.

FIELD OF THE INVENTION

The present invention relates to data privacy, and more particularly, is related to limiting data copy access from a computer to external devices.

BACKGROUND OF THE INVENTION

Companies and other organizations have an interest in protecting data on their computer systems. Therefore, system administrators may wish to monitor operations that copy data to an external device. Usually security solutions dealing with external devices (for example, an external data storage device connected via Universal Serial Bus (USB) device) will either block copy transactions to USB devices or will encrypt data copied to USB devices. However, such solutions may be draconian, as it blocks all such copy operations rather than just malicious copy operations, and there are many legitimate reasons for copying data to external devices that the system administrators do not wish to inhibit. Therefore, there is a need in the industry to address the above mentioned shortcomings.

SUMMARY OF THE INVENTION

Embodiments of the present invention provide context based authorized external device copy detection. Briefly described, the present invention is directed to a system and method monitoring access of an external storage device connected to a target device. A notification of a connection of the external storage device to the target device is received, a notification of an external file access on the external storage device is received, and activity of a user on the target device is monitored to detect a user operation accessing a source file stored on the target device. Events are logged based upon the connection, the user operation, and the external file access. Two or more of the events are associated with a copy of the source file to the external connected storage device. An alert regarding the association is forwarded to a monitor application in communication with the target device.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 3 is a diagram of a data structure containing USB device information.

FIG. 4A is an example of a screen shot showing a correlation result action,

FIG. 4B is an example of a screenshot showing device information related to the correlation result action.

FIG. 4D is example of a screenshot collected by the operating system showing context around the time of a copy operation to an external device.

FIG. 4F is a screenshot showing an example from the system of activity before and after an event for a copy to an external device.

DETAILED DESCRIPTION

The following definitions are useful for interpreting terms applied to features of the embodiments disclosed herein, and are meant only to define elements within the disclosure.

Figure 2:
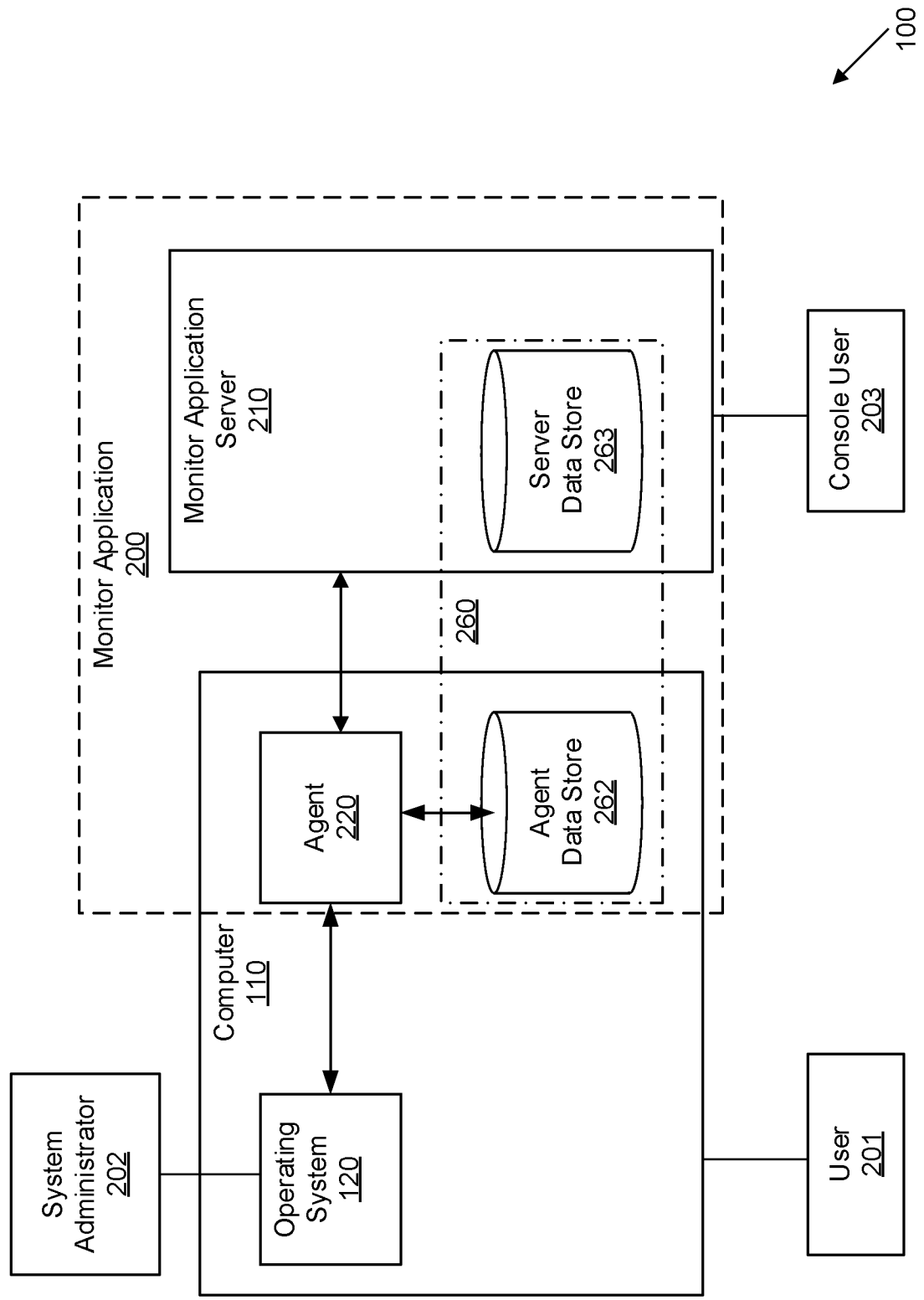
FIG. 2 is a schematic diagram detailing the monitor application of FIG. 1.

As used within this disclosure, in general, a "user" is a human who interacts with the computer 110 (FIG. 2) described in the embodiments. Two other humans are also described as interacting with the system, namely a system administrator 202 (FIG. 2) who may control and configure the operating system of the computer, and a console user 203 (FIG. 2), who may control and interact with embodiments of a monitor application 200 (FIG. 2), described in further detail below. For example, in the description of the embodiments below, the console user 203 (FIG. 2) may monitor activity of the user 201 (FIG. 2) of the computer 110 (FIG. 2).

As used within this disclosure, "USB device" refers to a data writing device external to a computer that connects to a computer system via a USB interface. It should be noted that while the embodiments described below generally refer to USB devices, in alternative embodiments the data writing device may be another type of data storing device, such as a secure digital (SD) card, and receive data from the computer system via other wired or wireless data protocols.

Reference will now be made in detail to embodiments of the present invention, examples of which are illustrated in the accompanying drawings. Wherever possible, the same reference numbers are used in the drawings and the description to refer to the same or like parts.

As per the Background section, there is a need for a solution that will still allow users to copy data to an external USB device, while alerting system administrators of suspicious data moving to specific external devices. Embodiments of the present invention monitor file copy transactions to USB devices and may generate alerts based on the copy action and the transaction information. For example, the embodiments may generate alerts based on the USB device type or whether the USB device is known and trusted, as well as generating alerts based on the history of the files being copied to a certain examined USB device, the source of the file transaction and other prior actions related to such file or such USB device, e.g. whether if the file was previously downloaded from a specific location. The embodiments may further correlate the copy action with other actions performed previously by the same user to provide additional context on the copy transaction itself.

Figure 1:
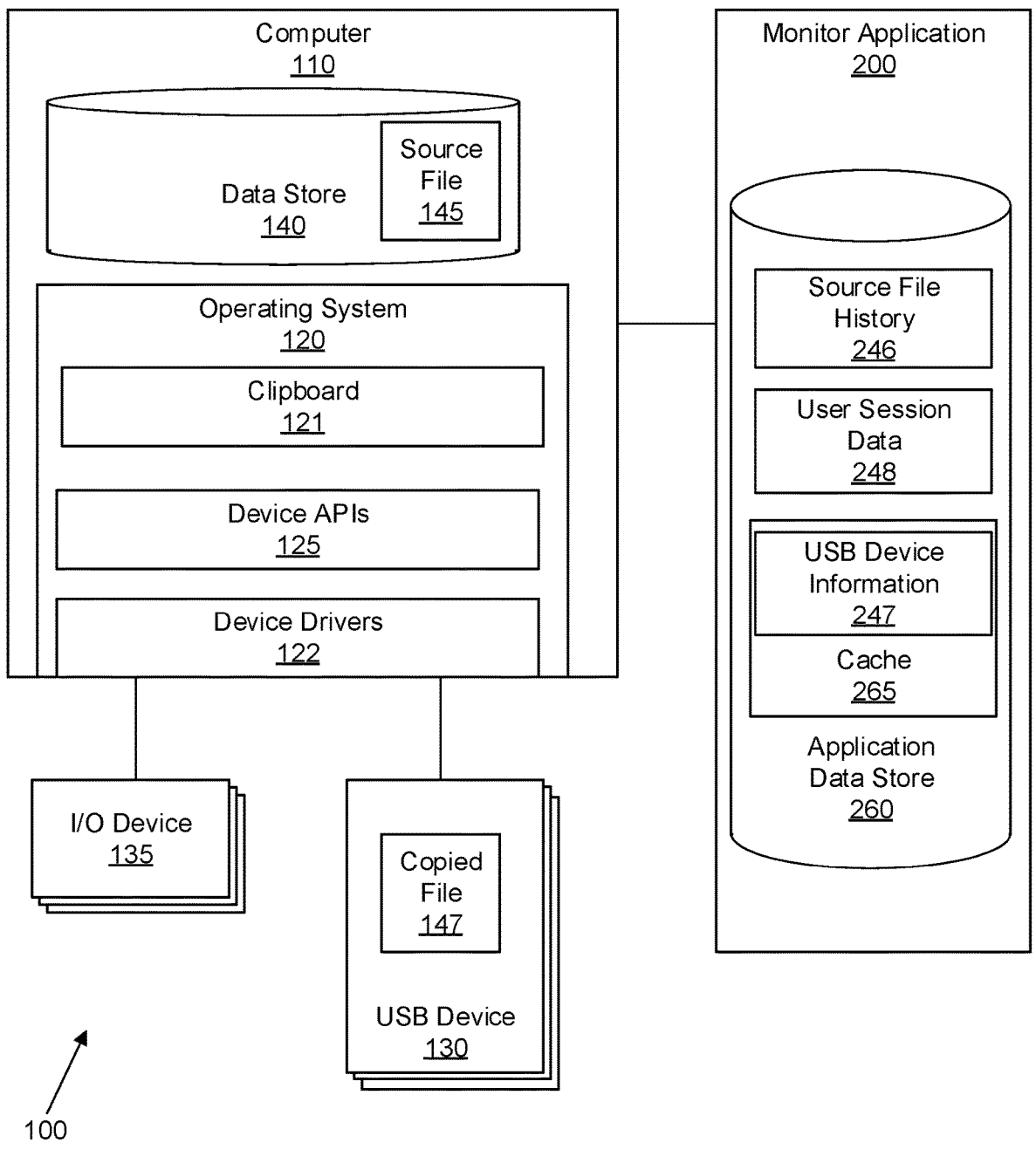
FIG. 1 is a schematic diagram showing a first embodiment of a system for detecting copies to external devices.

FIG. 1 is an exemplary system 100 for implementing the embodiments of the present invention. A computer 110 includes an operating system 120 and a data store 140. The data store 140 indicates one or more storage devices whose access is controlled by the computer 110, for example, hard drives, solid state drives, tape drives, optical drives, and the like. The operating system includes device drivers to support external devices, for example I/O devices 135, such as a mouse, trackpad, keyboard, etc., and external USB storage devices 130, for example, hard drives, flash drives, SSD drives, and the like. A monitor application 200 is in communication with the computer 110. In some embodiments, the monitor application may be resident in the computer 110, while in other applications the monitor application may be hosted in an external computing device, such as a server (not shown) in communication with the computer 110, for example via a wired or wireless network. The monitor application 200 has an application data store for data used by the monitor application 200, for example, application state data.

Figure 6:
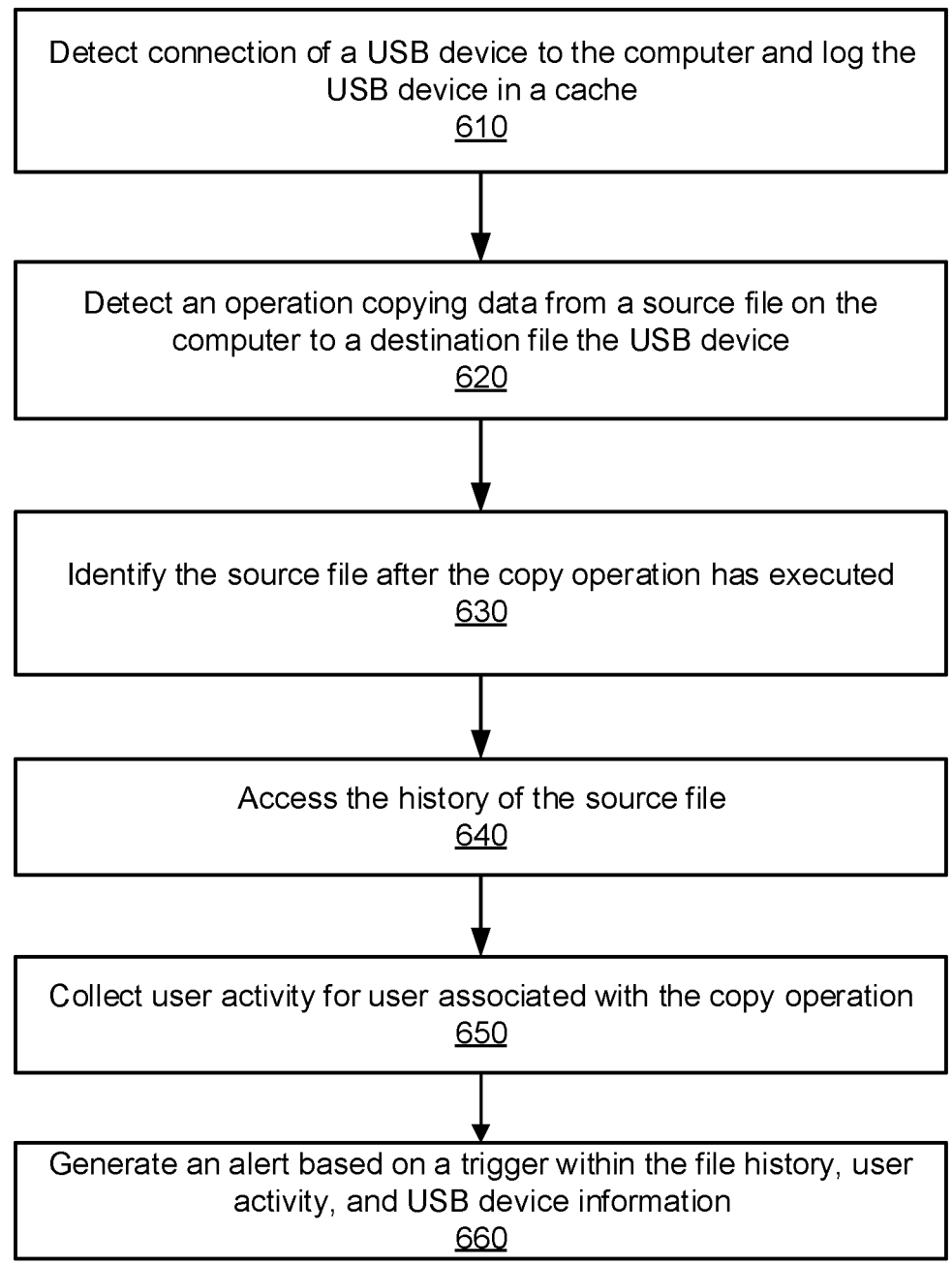
FIG. 6 is a flowchart of an exemplary embodiment of a method for detecting copies to external device.

FIG. 6 is a flowchart 600 of an embodiment of an exemplary method for monitoring copying data to an external device. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. FIG. 2 is a block diagram of the monitor application 200. The method 600 is described with reference to FIGS. 1 and 2.

The monitor application 200 detects the connection of USB device 130, as shown by block 610. For example, native OS APIs 125 (such as DARegisterDiskAppearedCallback on MacOS) provide notification to the monitor application 200 of connection/disconnection of an external USB device 130, and (DARegisterDiskDisappearedCallback on MacOS) provides notification to the monitor application 200 of disconnection of the external USB device 130. While the first embodiment refers to an external USB device 130, in alternative embodiments other types of external devices may be used. The USB device 130 is scanned for device information such as device identifiers and operating parameters. The device information is stored using a storage device data structure 300 in the application data store 260, for example, in a cache 265 within the application data store 260. Upon initial detection of a USB device 130, the monitor application 200 creates a data structure entry (300, FIG. 3) in the cache 265. The data structure 300 may be updated upon subsequent detected activities, for example data transactions with the USB device 130 and subsequent insertions/removals of the USB device 130.

The monitor application 200 detects an operation copying data from a source file 145 on the computer 110 to a copied file 147 on the USB device 130, as shown by block 620. Under the first embodiment, only storage type external devices are monitored by the monitor application 200. For example, the monitor application 200 ignores connection of a USB mouse 135 unless the USB mouse 135 also has data storage capabilities. Typical external devices 130 monitored by the monitor application 200 include, for example, USB thumb drives and external disks and the like that the operating system 120 detects and generates a corresponding storage mount point. Other examples include mobile devices that provide a storage option when connected to the computer 110.

Upon detection of a connection with an external device 130 to the computer 110, the operating system 120 generally mounts the external device 130 according to a predetermined address in a file system of the computer 110. For example, USB device 130 may typically be mounted to E:\ or /Volumes/BackupDisk. During the time when the USB device 130 is mounted, every subsequent data copy to this file system location may be associated with the USB device 130.

The copy of a file to the USB device 130 may be difficult to detect, as the operating system 120 may not specifically report a file copy operation. Instead, the OS 120 may notify the monitor application 200 of a file open or file create operation on the USB device 130. However, it may not be clear whether the file opened/created 147 on the USB device 130 was the source file 145 copied from the computer 110. Therefore, the monitor application 200 must determine based upon user activities and/or recorded events on the computer 110 prior to the file open/create operation that the file create/open operation on the USB device 130 whether the open/create operation involved a file copy operation. The monitor application 200 may make the determination that a create/operation involved a file copy operation, for example by reviewing the user session data 248 to determine whether a source file 145 on the computer 110 was copied to a pasteboard (MacOS)/clipboard (Windows) 121 of the operating system 120 prior to the file create/open operation on the USB device 130. For example, the source file 145 may have been copied to the clipboard 121 by an application such as Finder (MacOS) or Explorer (Windows). If so, the monitor application 200 may scan events in user session data 248 to determine whether the source file 145 had been copied to the clipboard 121 prior to the file create/open operation on the USB device 130. In this manner, the monitor application 200 is able to deduce that the file create/open operation on the USB device 130 was in fact a copy operation copying the source file 145 from the computer 110 to the copied file 147 on the USB device 130.

Figure 7:
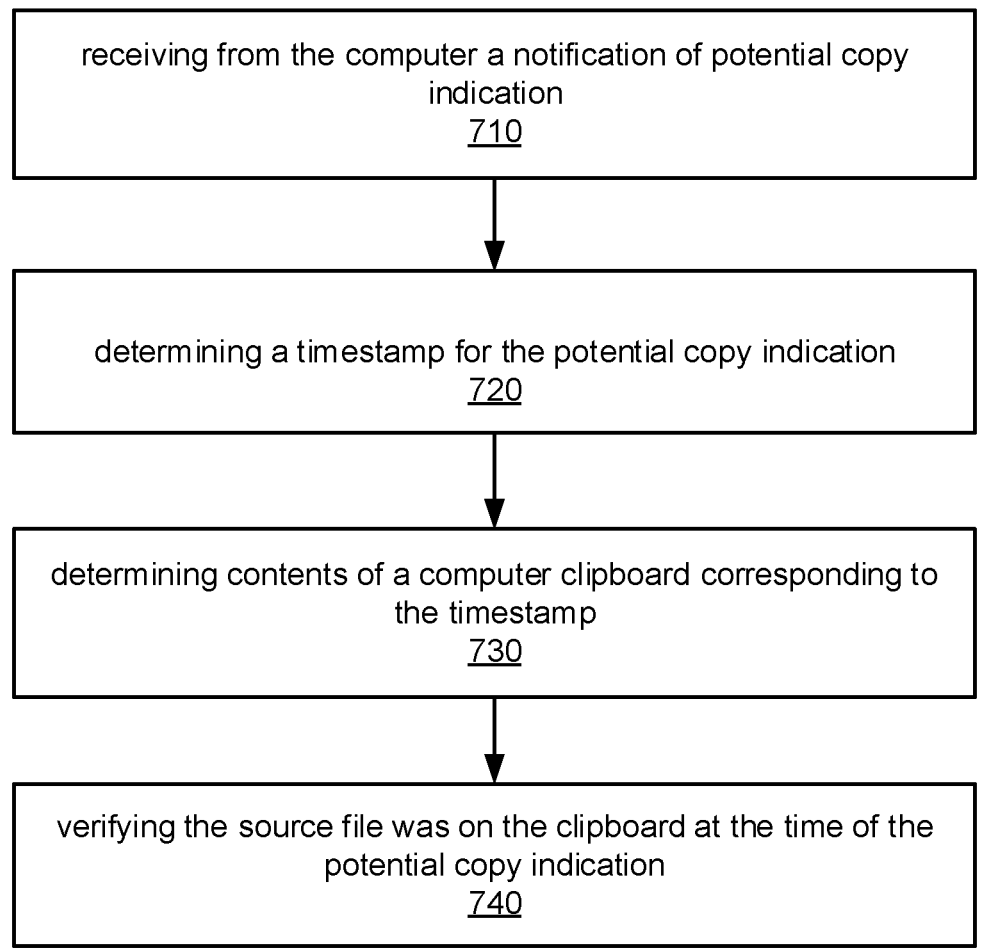
FIG. 7 is a flowchart providing additional detail of block 620 of FIG. 6.
Figure 7:

An example of the above description is summarized in FIG. 7, a flowchart expanding block 620 of FIG. 6. A notification of potential copy indication receiving from the computer, as shown by block 710. The indicating may be, for example, a file create event or a file open event on the external data storing device. A timestamp for the potential copy indication is determined, as shown by block 720. Contents of a computer clipboard corresponding to the timestamp are determined, as shown by block 730. The contents of the computer are used to verify the source file was on the clipboard at the time of the potential copy indication, as shown by block 740.

It should be noted that FIG. 7 depicts one way to detect an operation copying data from a source file on the computer to a destination file the USB device, specifically a copy via clipboard (copy and paste). Alternative file copy detection methods include detecting a drag-and-drop (pasteboard on MAC or tracking mouse drag actions) operation as well as a more generic copy operation implemented by, for example, detecting command line strings and/or command key strokes and correlating them with file create and open operations executed by the same process, for example in two different locations on disk. In each of these scenarios, user activities (key commands, command line, and/or mouse tracking actions) that may be involved in a potential file copy operation are flagged as events and logged/stored. These logged events may be associated with earlier and/or later events to collectively be steps of a file copy to the external device.

The monitor application 200 can also register to a device API 125, for example a mobile API native to the operating system 120 if a USB device 130 is mounted. Here the device API 125 may be used to detect a data copy event to mobile devices. Using the device API 125 associated with the USB device 130 the operating system 120 may detect copy operations to the USB device that may not be performed via user interface action (e.g., via actions initiate by the I/O devices 135) and are thus not visible as regular file activity to the native OS kernel. Alternatively, the detected operations may be performed via the user interface, but if the target is a mobile then the kernel will not show system calls on the target, but the kernel will show the calls on the source. For example, this would capture copy operations that do not generate a "create" or "open" operating system call on a mobile device.

The monitor application 200 identifies the source file 145 after the copy operation has executed, as shown by block 630. The when the monitor application 200 detects the copy to the USB device 130, the monitor application 200 adds a source file history 246 file associated with the source file 145 of the copy operation to the application data store 260. For example, the monitor application 200 may search for previous OS level events where the source file 145 was opened, perhaps in a different location (by the same process that created the copy of the source file 145 on the USB device 130) or searching the user session data 248 for the filename of the source file 145 in OS objects on the computer 110 related to copy operations by a user 201 (FIG. 2), such as drag-and-drop operations (monitoring mouse drags), clipboard operations, pasteboard operations, dragboard operations, events detected by UI (user interface) operations (such as tracking a file picker used to pick files via the UI) and/or low level open system calls reported by a device driver 122, such as opening the source file 145 for read by the same process that copied the source file 145. FIG. 4A shows an example of correlation result action, and FIG. 4B shows an example of device information related to the correlation result action.

The monitor application 200 accesses the full history 246 of the source file 145, as shown by block 630. Once the source file 145 is identified, the monitor application 200 can access the source file history 246, which contains information associated with the source file 145. For example, the operating system 120 may track sensitive files or files originating from specific locations, for example email files, web or network share file. The source file history 246 provides the origin of the source file 145, for example, the source file 145 was received as an email or email attachment, or perhaps the source file 145 was downloaded from a web location in the internet or intranet. The monitor application 200 may also identify two or more events in the source file history 246 that may represent several steps of an operation, for example download, copy locally, and rename. This source file history 246 may provide additional insight, such as a chain of events that may be correlated to determine whether the copy of the source file 145 to the USB device 130 is a matter of concern.

Figure 4C:
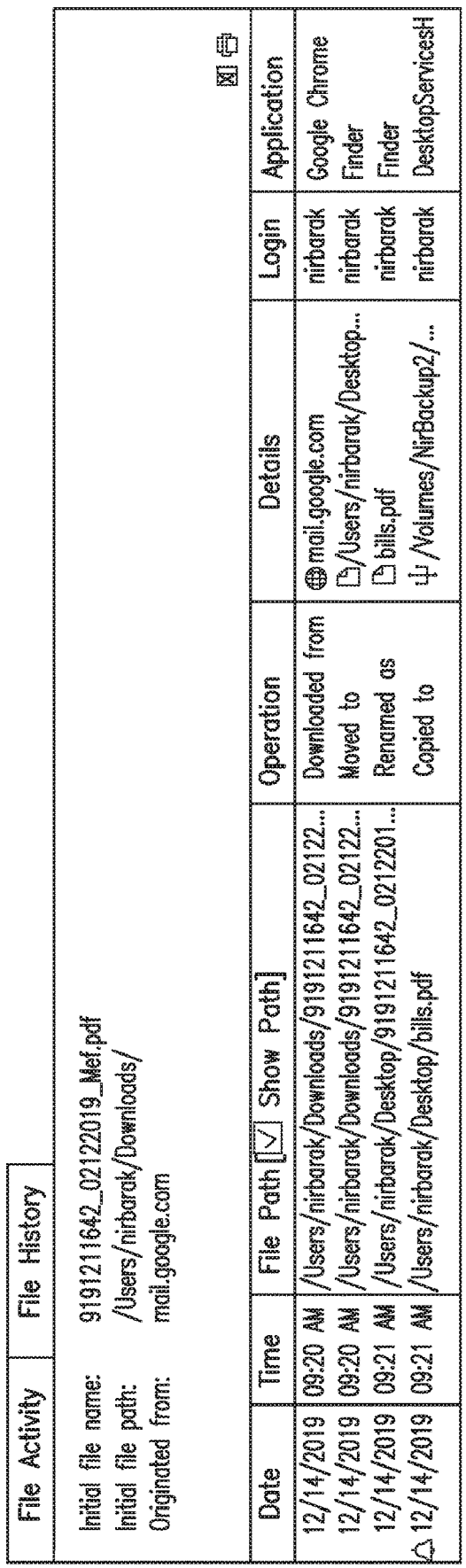
FIG. 4C is an example of a screenshot showing an example of a file history of a source file of a copy operation.

The chaining of the source file history 246 is based upon a specific file name and path as of the time the source file 145 first entered the computer 110. Every time the source file 145 is copied, renamed, or moved the monitor application 220 creates events based on events from the operating system and other collected data (such as the source file history 246 and the user session data 248). Exemplary events include a rename event or a copy event. Here, the copy event is not granular on the OS level but built of several events as described earlier in the copy to USB event. The monitor application creates the new event, correlates the new event with previous events, and continues to track the new path and the file name or both (for example, in the case of a copy operation) resulting in a full chain of correlated events on the tracked file. FIG. 4C shows an example of the source file history 246.

The monitor application 200 collects user activity as user session data 248 for a user associated with the copy operation, as shown by block 650. Examples of user activity include, but are not limited to process details, screenshots and the like. For example, the monitor application 200 may be configured to record each user session, for example including screenshots of the screen of the user during the user session so for investigation purpose the operating system 120 may provide a screenshot taken at the time of the copy operation. The user activity data is combined together with data regarding the copy operation. The compiled time-stamped user activity includes all information received from the OS 120, for example, user name, process name, window information, and screenshots, among others. The user activity is retained for later reference, for example to provide information on activities that are not actively monitored occurring before and after the specific corelated activity (based on the session ID and time).

The combined user activity data and the copy operation data provides context for the copy operation, indicating the process for the copy operation was done, a visual representation of the display of the user when the copy operation was performed and before, and can show other actions performed by the user when preparing for the copy operation.

Figure 4D:
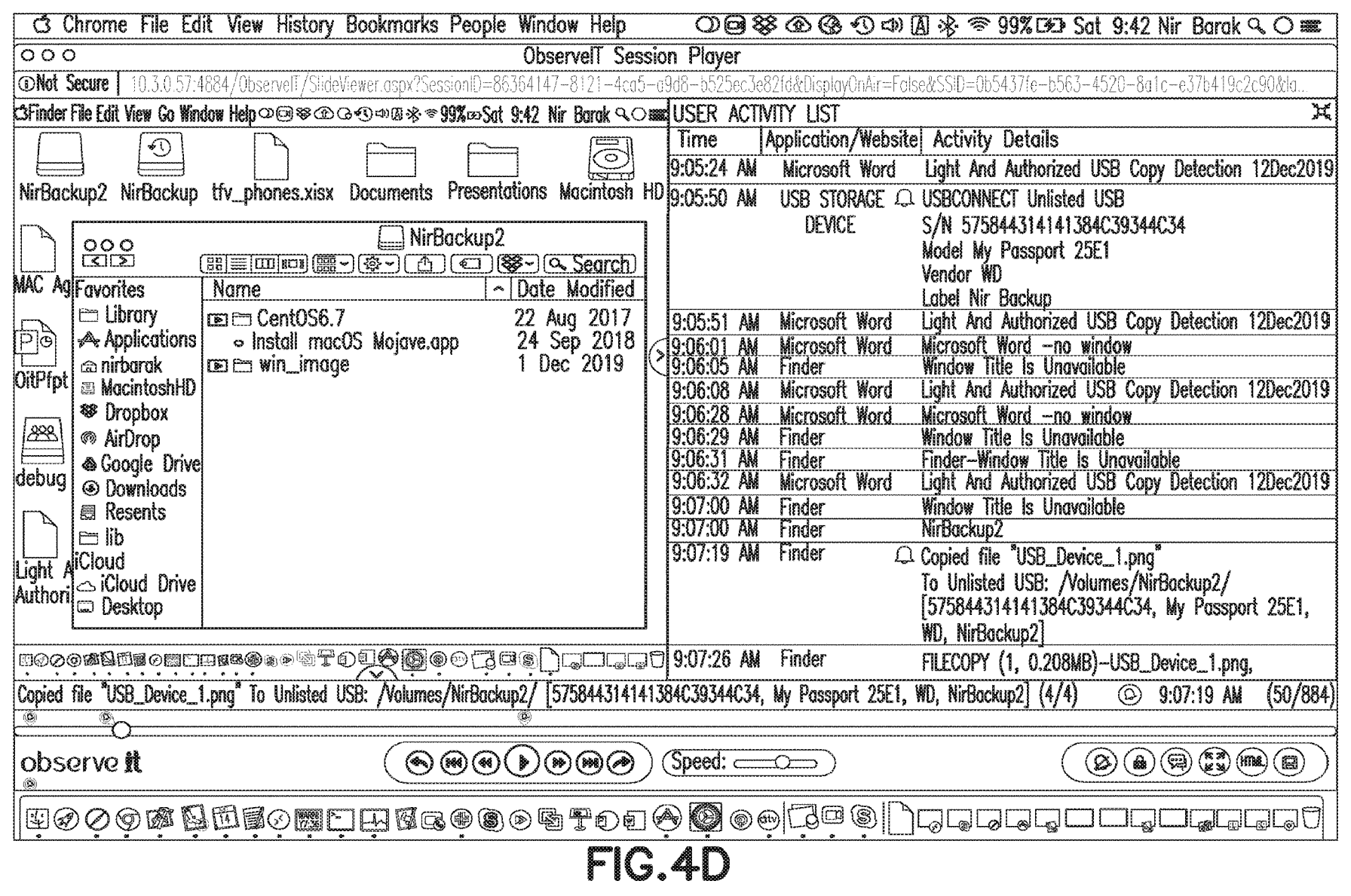

The detected copy activity and screenshots may also be correlated with metadata collected by the OS 120 and/or the monitor application 200 at or around the time of the copy operation. The metadata may include, for example but not limited to additional information from the native OS 120 at the time of the copy operation, such as a process used by the user session, an application used, and/or additional information such as a window title and/or key/mouse activity. An example of a screenshot collected by the OS 120 showing context around the time of the copy operation is shown by FIG. 4D.

The monitor application 200 compiles the source file history 246 including file activity events and the connection between the events. Each item in the source file history 246 includes a reference to any user session data 248 that occurred at or near the same time, including the session ID.

The monitor application 200 associates each event in the history to the corresponding user session.

An alert is generated based on one or more triggers within the file history, external device information, and user activity, as shown by block 660. A trigger refers to a detection of a pre-defined pattern of data within one or more of the file history, external device information, and user activity. For example, the console user 203 (FIG. 2) may want to set up an alert for each time a ".doc" file is downloaded from a specific web site and copied to the USB device 130. The console user 203 (FIG. 2) creates a rule specifying the web site URL (for example, mail.google.com) and file type "*.doc" and an action of copy to USB (either a specific untrusted USB or any USB), and specifies that an alert be generated when the conditions of the rule are detected in user activity. For another example, an alert may be set to be triggered if the original file name (the name when it entered the system say over download) of a downloaded file included specific text (e.g., "customer") so the alert would still be triggered even if the user renamed the file after download, for example, to "my_picture.jpg" and then copied the renamed file 147 to the USB device 130.

The trigger may be based on the file history, the external device information, whether the USB device 130 is known device. For example, the device information may indicate whether the USB device 130 was previously listed in the system by prior action of the system administrator 202, is a new device (previously unlisted), was previously flagged as being safe or not safe). The trigger may be based on the origin of the source file 145 according to the file history. For example, the original of the source file 145 may previously been identified as a secure or insecure source. The trigger may also be based upon the original name and/or properties of the source file 145, therefore capturing copies of files that have been renamed with intent to avoid detection.

Figure 4E:
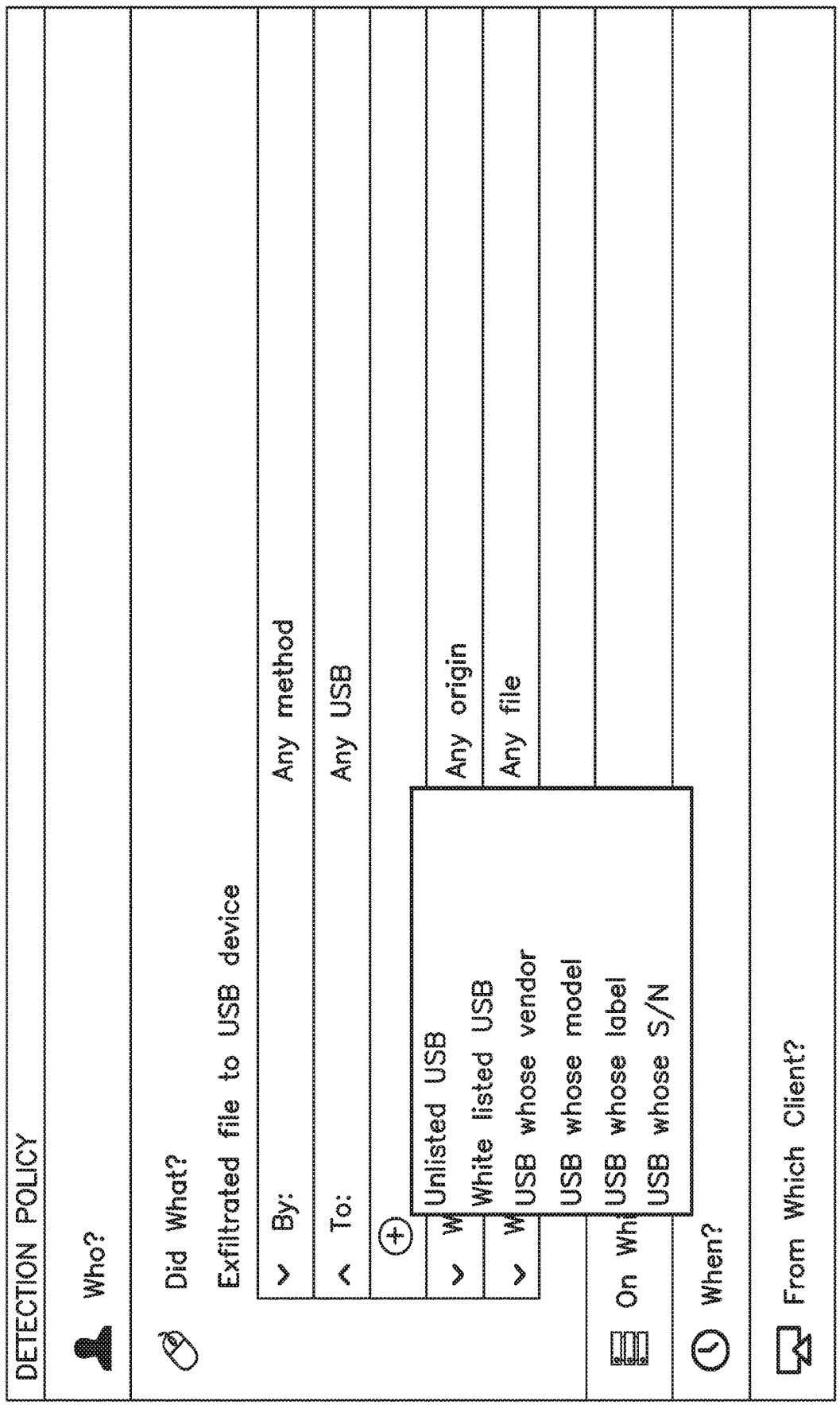
FIG. 4E is a screenshot of an example alert under the first embodiment.

FIG. 4E is a screenshot of an example alert under the first embodiment. The monitor application 200 may generate an alert as a result of the monitor application detecting events that match the trigger. An alert is a notification to the console user 203 and/or the system administrator 202, for example, an email, text message, screen notification, or other means. In general, the alerts may be provided to inform the console user 203 and/or the system administrator 202 that data that may pose some risk to the organization is being removed from the computer and copied onto to an external device 130. Like the trigger, an alert may be based not only on current file data but also on the history of the source file 145 and/or properties of the external device the source file 145 was copied to, including device information, for example a serial number of the USB device 130 and/or whether this USB device 130 was used before or not with the computer 110, whether this USB device 130 was flagged as safe or unsafe by the system administrator 202, et cetera.

Even if an alert is not generated, for example, if the data in the server data store 263 may be of interest even if it does not meet a trigger threshold, data in the server data store 263 may be saved and available for review. For example, the saved data may be viewed in subsequent activities detected during a session of the user 201 and/or in other related sessions. The data may be saved with other user data, so the console user can search it for a future investigation that may provide additional context not identified at the time the data was collected, but may bring concerning activities to light when viewed together with other actions, for example, other actions on the computer 110 by the user 201 whether earlier or later than the presently collected activity, after being correlated with other actions. FIG. 4F is a screenshot showing an example from the system of activity before and after an event for a copy to an external device.

Additionally, the monitor application 200 includes a report module configured to generate reports on the file operations, the external devices, and events related to the external devices 130 based on events stored in the application data store 260. The report module may generate a report based upon a specific events and/or criteria, for example, a report of all copy to USB operations by specific user, specific system, or specific USB device (identified by serial number). For example, the monitor application 200 may provide a website interface that allows the console user 203 (FIG. 2) (or another user with access to the monitor application) to select from a list of report types and data filters.

While FIG. 1 represents the monitor application 200 as a single entity for purposes of clarity while describing the embodiments, in practice the monitor application may be implemented in a distributed fashion. FIG. 2 is a schematic diagram of an exemplary distributed implementation of the monitor application 200. The monitor application 200 includes an agent 220 that is resident in the computer 110, and a monitor application server 210, which as implemented here is remote from the computer 110, for example, in communication with the agent 220 via a wired or wireless communication network such as a local area network, a wide area network, or via the internet, for example, a cloud based server. The Agent 220 may be configured to communicate with the operating system 120 of the computer 110, for example, the agent 220 may register for notifications from the operating system 120 when a specific user related activity is detected by the operating system 120. Upon receipt of a notification from the operating system 120 by the agent 220, the agent 220 may communicate notification data received from the operating system 120 to the monitor application server 210. For example, the agent 220 may forward all received notification data to the monitor application server 210, or the agent may selectively forward selected notification data to the monitor application server 210, for example the agent 220 may be configured by the monitor application server 210 with a selection criteria to determine what notification data to forward to the monitor application server 210. The data store 260 (FIG. 1) may be distributed between an agent data store 262 resident on the computer 110 and a server data store 263 resident on the monitor application server 210.

For example, the agent 220 may store a file history in the agent data store 262 based upon notifications from the OS 120 to keep track of actions related to a file or device. In contrast, the server 210 can access file/device history information based on events in the server data store 263 received from the agent 220.

The agent 220 may be tailored to communicate with a specific operating system 120 resident on the computer 110. For example, the agent 220 may be specific to Windows OS, MacOS, or Unix/Linux, among others. While FIG. 2 shows a single monitor application server 210, the monitor application server 210 may be distributed across two or more physical server devices. Likewise, the server data store 263 may be distributed across two or more physical server devices.

In general, the agent 220 may be configured to act as an intermediary between the operating system 120 and the monitor application server 210, in particular, the agent 220 generally conveys collected data to the monitor application server 210, and the monitor application server operates upon the collected data to determine if targeted activities have been performed by the user 201.

As noted previously within this disclosure the user 201 is a human who interacts with the computer 110 the system administrator 202 is a human who controls and configures the operating system 120 of the computer 110, and the console user 203 is a human who controls and interacts with the monitor application 200. Of course, there may be a plurality of users 201, system administrators 202, and/or console users 203, and in some circumstances a system administrator 202 and the console user 203 may be the same individual.

The flow of activity and communication between the components is as follows: The monitor application 200 includes an agent 220 which is installed locally on the computer 110. The agent 220 captures information about user activity, secures it, and sends it to the monitor application server 210. In embodiments where there is more than one monitor application server 200, they may be load balanced with either a software or hardware-based device (not shown). In that case the agents 220 communicate with the load balancer's virtual IP (VIP). The monitor application server 210 analyzes and compresses received data, then stores the data, for example by splitting textual data in the server data store 263, and graphic images on the server data store 263, for example, a file share. The console user 203 may connect to a Web Console Web-based interface to the monitor application 200, for example using a web browser, and search for alerts, replay alerts, run reports on alerts, and inspect alerts based on the captured user activity. Any component of the data transfer or data storage process can be encrypted (for example https using server authentication or mutual authentication (both server and client authentication)), if desired. For example, the data transferred from the agent 220 to the monitor application server 210 may be encrypted, data transferred from the monitor application server 210 to the agent 220 may be encrypted, and data stored in the agent data store 262 and/or the server data store 263 may be encrypted, for example using standard encryption methods like AES protocol or other encryption methods supported by the database.

Figure 8:
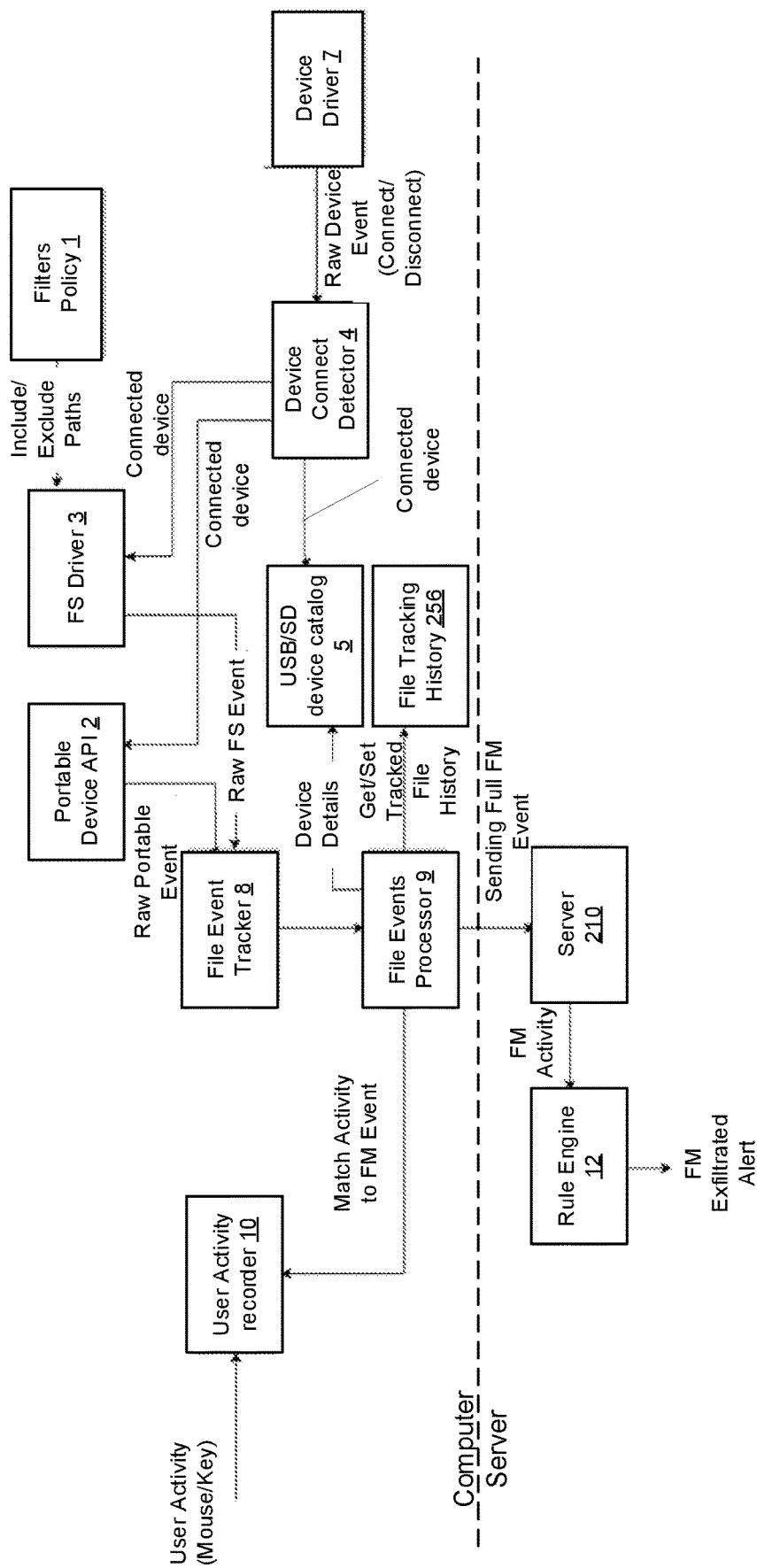
FIG. 8 is a block diagram indicating an exemplary flow of events in the system of FIGS. 1 and 2.

FIG. 8 is a block diagram indicating an exemplary flow of events in the system 100. A filters policy provides one or more policies to a file system (FS) driver 3 on the agent 220, for example, a policy having one or more include/exclude paths. An include path is a file system path (for example, a specific file pathname such as /user/nirb/docs/customer.txt or something more generic such as /volumes/myBackup/*) of a file on the computer 110 to be monitored by the system 100. Similarly, an exclude path is a file system path of a file on the computer 110 that is not to be monitored by the system 100. The agent 220 may also include kernel extensions, for example a file filter kernel module (not shown) which extends the OS kernel and can provide notifications and data of specific system calls such create or open of specific files or file pattern like E:*.

A portable device API 2 is an API of the device APIs 125 (FIG. 1) specific to a portable device, such as the USB device 130. A device driver 7 of the device drivers 122 (FIG. 1) on the OS 120 is specific to the USB device 130. When the USB device 130 is connected to or disconnected from the computer 110, the device driver 7 provides a raw device event to a device connect detector 4. The device connect detector 4 is part of a service process of the agent 220 which monitors events from the OS level on connected devices from the device driver 7.

Upon receipt of the raw device event from the device driver 7, the device connect detector 4 adds a specific rule to track the device to the FS driver 3. For example, if the device connect detector 4 detects a new USB device mounted as disk E, the device connect driver adds a new rule in the FS driver 3 to monitor activity on E:\. The FS driver 3 compares the raw device event to a list of received filters policies, and if the event pertains to a path of interest according to one or more of the policies, thereafter provides raw FS events, in this case create/copy/rename operations related to E:\, to a file event tracker 8 of the agent 220 service process. The device connects detector 4 logs the raw device connect/disconnect with a USB device or secure digital (SD) card device catalog 5.

The file event tracker 8 receives events from the device connect detector 4 to form file activity events. Upon receipt of the raw device event from the device driver 7, the device connect detector 4 provides a rule to detect activity related to the device to the portable device API 2 to the file event tracker 8. For example, the raw portable event may be a device connect event or a device disconnect event such as IPortableDeviceEventCallback interface on the Windows OS.

From a high level, once the device connect detector 4 detects a connection of an external device, the device connects detector 4 catalogs information regarding the external device and adds rules needed to track the device in the FS driver 3 (for regular USB storage like external disk) or the portable device API 2 (to track mobile activity which does not create file system events). Based on these rules the FS driver 3 or portable device API 2 generates events (like open/create/delete/rename) to send to the file event tracker 8, which in turns forward the events to the file event processor 9. The file event processor 9 correlates two or more events to synthesize a file copy event to the external device, for example by associating user activity events, external device access events, and file tracking history events. The file event processor 9 may update the file history 256 and generate the events to be sent to the server 210. This is described in further detail below.

The file events tracker provides an event notifying a file events processor module 9 of the agent 220 of any activity regarding the USB device 130, for example, connection/disconnection of the USB device 130, the creation/opening of a file on the USB device 130, and or file manager (FM) activity, for example copy/delete/rename activity for a pathname resolved to the USB device 130.

The file events processor module 9 associates the FM activities with the USB/SD device catalog, file tracking history 256 and user activity recorded by a user activity recorder 10. The user activity recorder 10 of the agent 220 detects and creates a record of a user activity such as a mouse or key action. If the file events processor correlates any of the user activity, the file tracking history, and/or information in the USB/SD device catalog 5, the file events processor module 9 sends a full file activity event to the monitor application server 210. A rule engine 12 on the server 210 receives the FM activity and produces an FM exfiltrated alert, for example, if the rule engine 12 determines that the FM activity matches one or more alert rules established by the console user 203.

Figure 5:
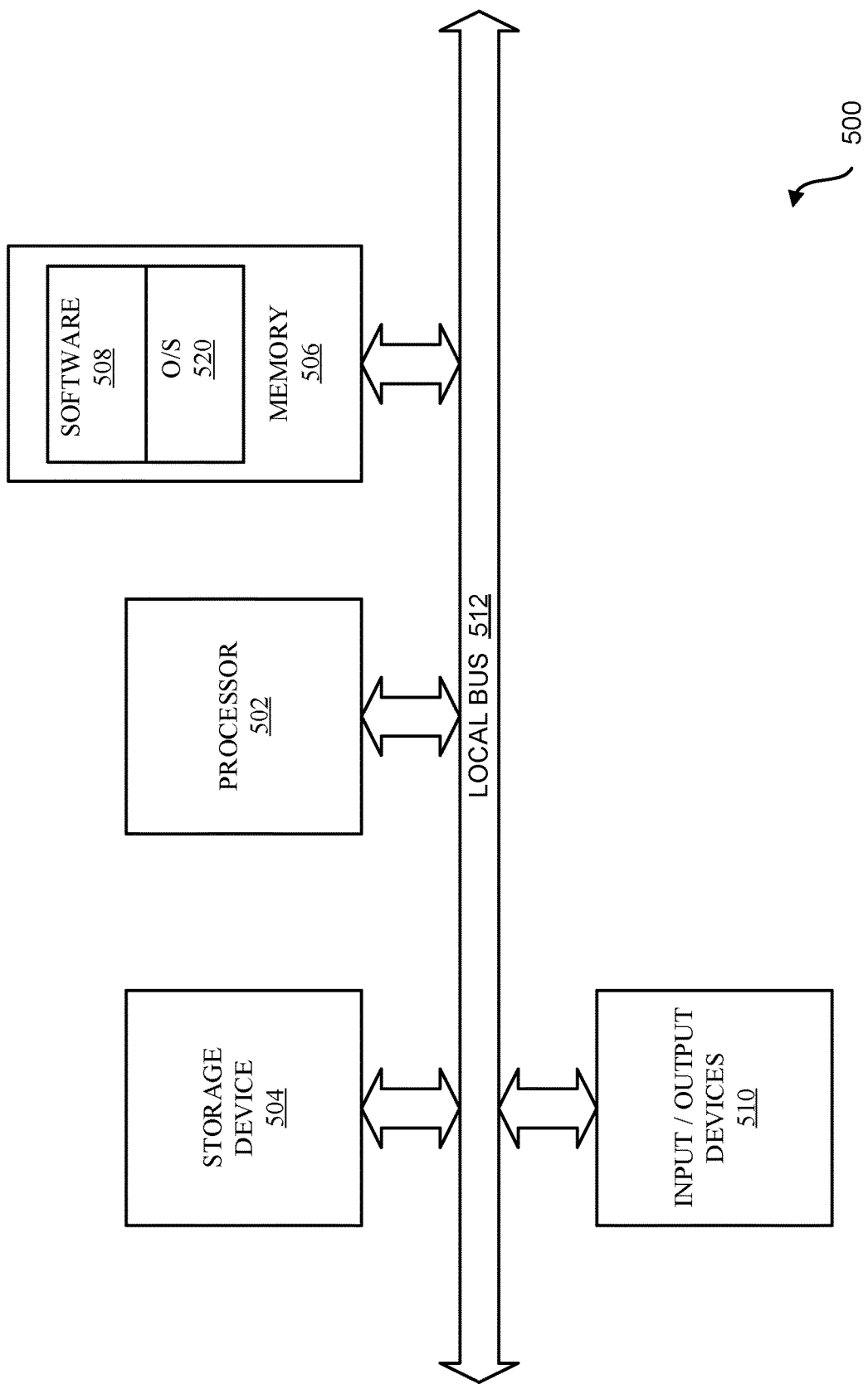
FIG. 5 is a schematic diagram illustrating an example of a system for executing functionality of the present invention.

As noted above, the agent 220 is generally specific to the operating system of the hosting computer 110. For exemplary purposes, the monitoring capabilities of an agent 220 specific to the Macintosh Operating System (MacOS) are described here. Analogous capabilities are provided for other operating systems, for example, Window and Unix/Linux. For example, the MacOS agent 220 registers with the operating system 120 to record and monitor, among others:

User Actions
    Mouse clicks
    Keystrokes
    Application changes
    Continuous recording (optional)
Metadata
    Screenshots (Optional)
    Window title (for the window in focus)
    URL (for Safari and Chrome)
    Application name (for the application in focus, including path)
    Process name (Including process ID)
    User name (Including domain name)
    Keylogging (keyword and commands)
    Data Access (USB connect/File move/File download/File copy/File upload)
Recording
    File activity monitoring
    Alerts
    Video and metadata recording
    Configurable recording policies (include/exclude users, applications, or URLs)
    Recording when Agent is offline
    Recording notification message
    Out-of-policy notifications (warning and blocking messages)
    Log Off and Close Application actions
    Health monitoring
    USB detection
    Console login
    Remote/VNC login
    Fast user switch
    Screen sharing The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electro-magnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In summary, the embodiments described above are directed to tracking file activity, tracking connected external devices (connected via USB), and determining whether the USB device is trusted or has previously been associated with suspicious activities. Once a file is moved to the USB the file name and target location, and the original location of the file are correlated with the file history to generate an alert. Additionally, the copy operation is tied to the user session to show actions before and after the copy to help determine if the copy action is legitimate or not. The copy action to the USB device may be associated with other operation on the USB device based on the serial number of the USB device.

The embodiments monitoring file copy transactions to a USB device may track the history of the file, the file origin, whether the USB device was determined to be trusted, the USB device history, and other user actions occurring before and/or after the USB copy transaction. A result an alert may be generated upon a file copy to a USB transaction under certain conditions indicating an illegitimate copy to USB transaction another risk to the organization.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for monitoring access to an external storage device, comprising:
    a target device comprising a first processor and a first memory configured to contain non-transitory instructions, that when executed, hosts an agent application of a monitor application configured to perform the steps of:
        receiving from an operating system (OS) of the target device a notification of a connection of the external storage device to the target device;
        receiving from the OS a notification of access to an external file on the external storage device;
        monitoring user session data on the target device for a user activity on the target device to detect a user operation regarding access to a source file stored on the target device;
        logging a first event based upon the connection;
        logging a second event based upon the user session data on the target device;
        logging a third event based upon the external file access;
        associating the second event with one or more of the first event and the third event with a copy of the source file to the external file; and
        forwarding an alert regarding the association to the monitor application in communication with the target device.

2. The system of claim 1, further comprising a server in communication with the target device, the server comprising a second processor and a second memory configured to contain non-transitory instructions that when executed perform the steps of:
    executing the monitor application, wherein the monitor application further performs the steps of:
    receiving the alert from the target device; and
    notifying a console user of the monitor application of the alert.

3. The system of claim 1, wherein the target device further performs steps of:
    registering a request with the OS for a notification that the external storage device has connected to or disconnected from the target device; and
    registering a request with the OS for a notification of a file access on the external storage device.

4. The system of claim 1, wherein the monitor application is resident on the target device.

5. The system of claim 1, wherein the target device is further configured to perform steps of:
    identifying the source file; and
    accessing a file history of the source file.

6. The system of claim 5, wherein the target device is further configured to perform steps of:
    receiving information regarding the external storage device; and
    storing the information regarding the external storage device in an external storage device history,
    associating two or more of the first event, the second event, and the third event with the copy of the source file to the external file further comprises information from the file history of the source file and/or information in the external storage device history.

7. The system of claim 1, wherein the target device is further configured to perform steps of:
    receiving information regarding the external storage device; and
    storing the information regarding the external storage device in an external storage device history.

8. The system of claim 7, further comprising the steps of:
    identifying the source file; and
    accessing a file history of the source file,
    wherein associating two or more of the first event, the second event, and the third event with a copy of the source file to the external connected storage device further comprises information from the file history of the source file and/or information in the external storage device history.

9. The system of claim 1, wherein the external storage device comprises a universal serial bus (USB) device.

10. The system of claim 1, wherein the user session data on the target device comprises a screenshot captured during a user session when the copy operation occurred.

11. A computer based method for monitoring a copy of a source file from a computer to an external data storing device, comprising the steps of:
receiving from an operating system (OS) of the computer a notification that the computer has detected a connection of the external data storing device to the computer;
receiving from the OS information regarding the external data storing device;
storing the information regarding the external data storing device;
determining based upon a computer notification that a copy operation occurred copying the source file on the computer to a destination file on the external data storing device;
identifying a path and a file name of the source file;
accessing a file history of the source file according to the path and the file name of the source file;
collecting user activity comprising user session data for a user associated with the copy operation; and
generating an alert based on a trigger corresponding to data of one or more of the file history, the user activity, and the information regarding the external data storing device,
wherein the source file is distinct from contents of a clipboard or pasteboard of an operating system of the computer.

12. The method of claim 11, wherein the external data storing device comprises a universal serial bus (USB) device.

13. The method of claim 11, further comprising a step of formulating the trigger.

14. The method of claim 11, further comprising a step of registering a request with the computer for the notification that the computer has detected a connection of an external data storing device to the computer.

15. The method of claim 11, wherein determining based upon the computer notification that the copy operation has occurred copying the source file on the computer to the destination file on the external data storing device further comprises:
receiving from the computer a notification of potential copy indication consisting of one of the group of a file create event and a file open event on the external data storing device;
determining a timestamp for the potential copy indication;
determining contents of a computer clipboard corresponding to the timestamp; and
verifying the source file was on the computer clipboard at the time of the potential copy indication.

16. The method of claim 11, wherein determining based upon the computer notification that the copy operation has occurred copying the source file on the computer to the destination file on the external data storing device further comprises detecting a drag-and-drop operation.

17. The method of claim 16, further comprising:
logging the detecting as an event in an event log; and
associating two or more events with a copy of the source file to the external data storing device.

18. The method of claim 11, wherein determining based upon the computer notification that that the copy operation has occurred copying the source file on the computer to the destination file on the external data storing device further comprises detecting a user entered command line strings and/or command keystroke combination.

19. The method of claim 18, further comprising:
logging the detecting as an event in an event log; and
associating two or more events with a copy of the source file to the external data storing device.

20. A computer based method for monitoring a copy of a source file from a computer to an external data storing device, comprising the steps of:
receiving from the computer a notification that the computer has detected a connection of the external data storing device to the computer;
receiving from the computer information regarding the external data storing device comprising an indication of a potential file copy of the source file to the external data storing device comprising one of the group of a file create event and a file open event on the external data storing device;
identifying a path and a file name of the source file;
accessing a file history of the source file according to the path and the file name of the source file;
collecting user activity comprising user session data for a user associated with the indication of the potential file copy; and
generating an alert based on a trigger corresponding to data of one or more of the file history, the user activity, and the information regarding the external data storing device,
wherein the source file is distinct from a copy of the source file on a clipboard or pasteboard of an operating system of the computer.

21. The method of claim 20, wherein the external data storing device comprises a universal serial bus (USB) device.

* * * * *